US012203643B2

(12) United States Patent
Suzuki

(10) Patent No.: US 12,203,643 B2
(45) Date of Patent: Jan. 21, 2025

(54) SUBSTRATE SHEET FOR CARD-TYPE LAMP UNIT, CARD-TYPE LAMP UNIT, AND VEHICLE LAMP

(71) Applicant: KOITO MANUFACTURING CO., LTD., Tokyo (JP)

(72) Inventor: Tetsuya Suzuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/722,343

(22) PCT Filed: Jan. 5, 2023

(86) PCT No.: PCT/JP2023/000041
§ 371 (c)(1),
(2) Date: Jun. 20, 2024

(87) PCT Pub. No.: WO2023/140108
PCT Pub. Date: Jul. 27, 2023

(65) Prior Publication Data

US 2024/0418355 A1 Dec. 19, 2024

(30) Foreign Application Priority Data

Jan. 18, 2022 (JP) ................................ 2022-005414

(51) Int. Cl.
*F21V 23/06* (2006.01)
*F21V 19/00* (2006.01)
(Continued)

(52) U.S. Cl.
CPC .......... *F21V 23/06* (2013.01); *F21V 19/0025* (2013.01); *F21V 23/005* (2013.01);
(Continued)

(58) Field of Classification Search
CPC .............. F21Y 2115/10; F21Y 2115/20; F21V 23/005; F21V 23/06; F21V 19/0025; F21V 29/70; F21V 29/503
See application file for complete search history.

(56) References Cited

U.S. PATENT DOCUMENTS

2021/0071851 A1 3/2021 Suzuki

FOREIGN PATENT DOCUMENTS

JP 2014154637 A 8/2014
JP 2021012867 A 2/2021
(Continued)

OTHER PUBLICATIONS

Innovation Q+ NPL Search (Year: 2024).*
International Search Report dated Mar. 14, 2023 filed in PCT/JP2023/000041.

*Primary Examiner* — Anabel Ton
(74) *Attorney, Agent, or Firm* — Pearne & Gordon LLP

(57) ABSTRACT

A substrate sheet (20) for a card-type lamp unit (5) includes the card-type lamp unit (5) which has a polygonal substrate body (10) having an outer peripheral side (**10*b* to 10*d*) and a connector forming side (12), an external connector insertion portion (11) formed on the connector forming side (12), a heat dissipation member (16) integrated with the substrate body (10) and having a linear expansion coefficient different from that of the substrate body (10), and a light emitting element light source (6) connected to a control circuit (13) for light ON/OFF and a frame body (23) integrated with the card-type lamp unit (5) via a coupling end portion (10*e*) formed on the outer peripheral side of the substrate body (10), in which a coupling end portion (21, 22) for the frame body (23) is provided on the connector forming side (12**).

5 Claims, 7 Drawing Sheets

(51) Int. Cl.

| | |
|---|---|
| ***F21V 23/00*** | (2015.01) |
| ***F21V 29/503*** | (2015.01) |
| ***F21V 29/70*** | (2015.01) |
| *F21Y 115/10* | (2016.01) |
| *F21Y 115/20* | (2016.01) |

(52) U.S. Cl.
CPC ............ *F21V 29/503* (2015.01); *F21V 29/70* (2015.01); *F21Y 2115/10* (2016.08); *F21Y 2115/20* (2016.08)

(56) References Cited

FOREIGN PATENT DOCUMENTS

| | | | |
|---|---|---|---|
| JP | 2021131937 | A | 9/2021 |
| WO | 2019117190 | A1 | 6/2019 |
| WO | WO-2023140108 | A1 * | 7/2023 |

* cited by examiner

25

SUBSTRATE SHEET FOR CARD-TYPE LAMP UNIT, CARD-TYPE LAMP UNIT, AND VEHICLE LAMP

TECHNICAL FIELD

The present invention relates to a substrate sheet for a card-type lamp unit including an external connector insertion portion and a heatsink having a different linear expansion coefficient, a card-type lamp unit, and a vehicle lamp.

BACKGROUND ART

In [0024] and [0025] of the specification and FIG. 3 of Patent Literature 1, a resin card-type light source is described, which has a large number of LEDs mounted on an element mounting portion and a connector portion protruding from the element mounting portion. In a case where a substrate connected to the LEDs is formed in the card-type light source on which these LEDs are mounted, it is conceivable that, e.g., a metal plate (heat dissipation member) is integrated with, e.g., the rear surface of the substrate to dissipate heat generated in the substrate at the time of lighting.

Further, the card-type light source as described in Patent Literature 1 is generally formed as a substrate sheet together with a frame body coupled via a large number of coupling end portions, and is cut out from the frame body by cutting of the coupling end portions.

CITATION LIST

Patent Literature

Patent Literature 1: WO 2019/117190 A

SUMMARY OF INVENTION

Problems to be Solved by Invention

When the LEDs are mounted on the substrate sheet having the card-type light source of Patent Literature 1 or the heat dissipation member such as the metal plate is integrated with the rear surface of the resin card-type light source of the substrate sheet to form a metal base substrate, the substrate sheet needs to be subjected to heat treatment. Such heat treatment generates “warpage” due to bending stress in the formed metal base substrate due to a difference in a linear expansion coefficient between the resin card-type light source and the metal plate.

Since the metal base substrate formed as the substrate sheet is integrated with the frame body via a large number of coupling end portions, an outer peripheral side coupled to the frame body via the coupling end portion among the sides of the metal base substrate is not warped by restriction of deformation by the frame body. However, since the coupling end portion for the frame body becomes a burr after cutting, if the coupling end portion is formed between the outer peripheral side of the connector portion and the frame body, warpage does not occur, but an adverse effect is provided on insertion and removal of the connector portion into and from an external connector. For this reason, since the coupling end portion cannot be formed between the connector portion and the frame body, the substrate sheet having the metal base substrate with the connector portion and formed as the substrate sheet has a problem that warpage is generated in the vicinity of the connector portion forming portion due to the heat treatment.

In view of the above-described problems, the present application provides a substrate sheet having a metal base substrate with a connector portion, a card-type lamp unit, and a vehicle lamp, which are less likely to warp in the vicinity of the connector portion even when heat treatment is performed.

Solution to Problems

A substrate sheet for a card-type lamp unit includes a card-type lamp unit including a polygonal substrate body having an outer peripheral side and a connector forming side, an external connector insertion portion formed on the connector forming side, a heat dissipation member integrated with the substrate body and having a linear expansion coefficient different from that of the substrate body, and a light emitting element light source connected to a control circuit for light ON/OFF, and a frame body integrated with the card-type lamp unit via a coupling end portion formed on the outer peripheral side of the polygonal substrate body, in which a coupling end portion for the frame body is provided on the connector forming side.

(Feature) Since a connector forming portion is coupled to the frame body via the coupling end portion, even if bending stress is generated in the vicinity of the connector forming portion when heat treatment is performed on the substrate sheet, warpage is restricted by the frame body.

Preferably, in the substrate sheet for the card-type lamp unit, a plurality of light emitting elements forming the light emitting element light source is provided on the substrate body, and the control circuit for light ON/OFF is mounted on the substrate body.

(Feature) When the control circuit for controlling ON/OFF of the plurality of light emitting element is arranged outside the card-type lamp unit, it is necessary to provide a metal conductive path for each of the plurality of light emitting element in the external connector insertion portion. In the invention of the present application, since the control circuit is mounted on the substrate body of the card-type lamp unit, it is not necessary to install the conductive path for each light emitting element in the external connector insertion portion.

Preferably, in the substrate sheet for the card-type lamp unit, the card-type lamp unit includes a plurality of card-type lamp units, and each card-type lamp unit includes an inter-coupling end portion coupling connector forming sides to each other instead of the coupling end portion for the frame body.

(Feature) In the substrate sheet, the connector forming sides of the plurality of card-type lamp units are coupled via the inter-coupling end portion, so that warpage generated in the vicinity of each connector forming side is mutually restricted.

Further, the card-type lamp unit is formed by being separated from the frame body of the substrate sheet by cutting of the coupling end portion, and the separated card-type lamp unit is provided in a vehicle lamp.

Effects of Invention

According to the substrate sheet for the card-type lamp unit, the warpage is less likely to occur in the vicinity of the external connector insertion portion relative to the frame body even when the heat treatment is performed.

According to the substrate sheet for the card-type lamp unit, since it is not necessary to form the conductive path connected to each of the plurality of light emitting elements from the control circuit for light ON/OFF in the external connector insertion portion, the width of the external connector insertion portion can be narrowed, and a much wider connector forming side can be ensured. Thus, by making the coupling end portion of the connector forming side thicker or providing more coupling end portions, prevention of the warpage generated in the vicinity of the external connector insertion portion can be enhanced.

According to the substrate sheet for the card-type lamp unit, it is possible to further enhance prevention of the warpage caused in the vicinity of the external connector insertion portion by mutually restricting the warpage generated in the vicinity of each connector forming side of the plurality of card-type lamp units.

Moreover, it is possible to obtain the card-type lamp unit and the vehicle lamp having the above-described effects.

DESCRIPTION OF EMBODIMENTS

Hereinafter, a preferred embodiment of a vehicle lamp of the present invention will be described with reference to FIGS. 1 and 2, and a preferred embodiment of a card-type lamp unit of the present invention will be described with reference to FIG. 3. In each figure, each direction of the vehicle lamp, the card-type lamp unit, and a substrate sheet will be described as (a front side: a rear side: a left end side: a right end side: a tip end side: a base end side=Fr: Re: Le: Ri: Lo: Up).

Figure 1:
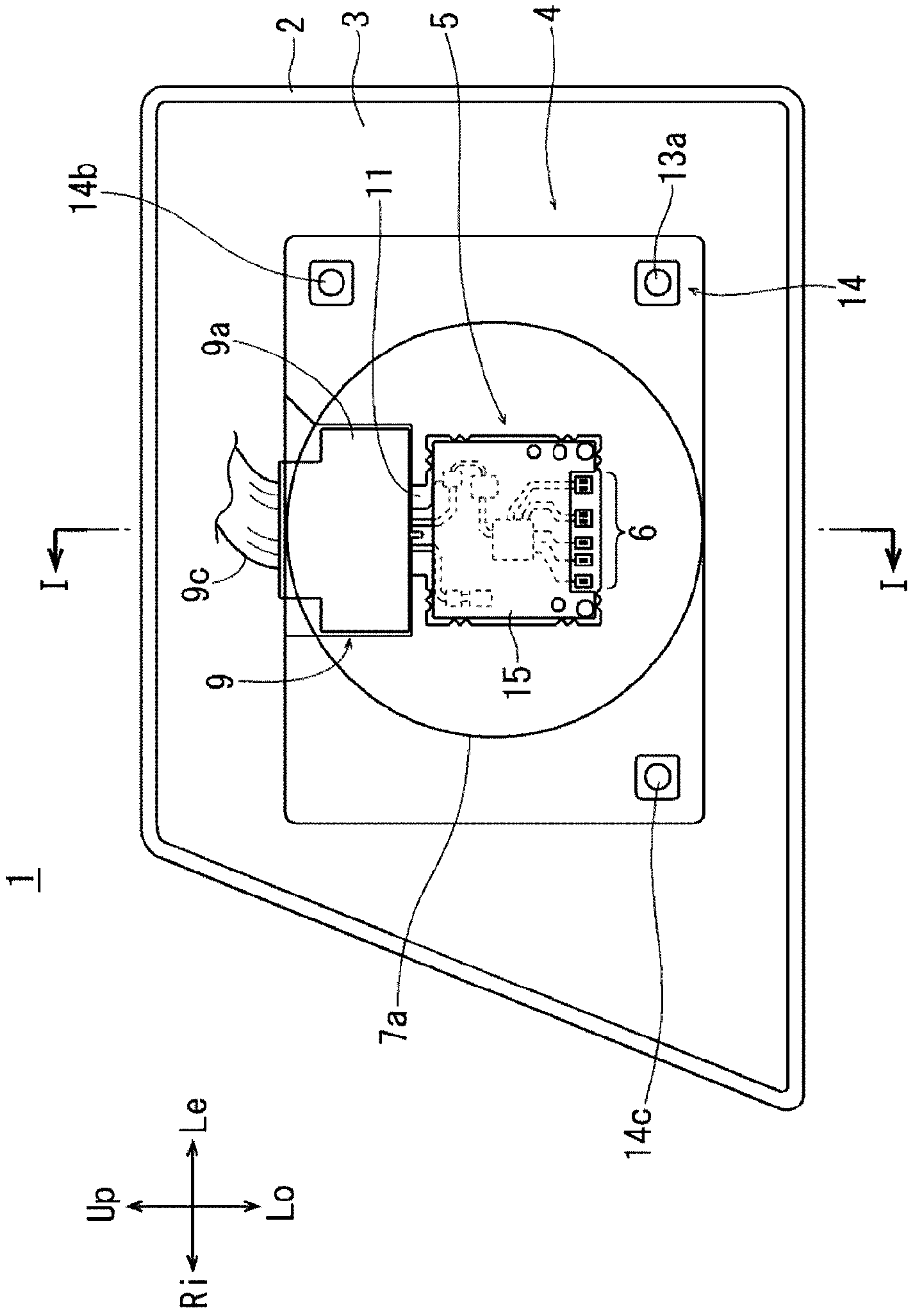
FIG. 1 is a front view of a vehicle lamp having a card-type lamp unit according to a first embodiment.
Figure 2:
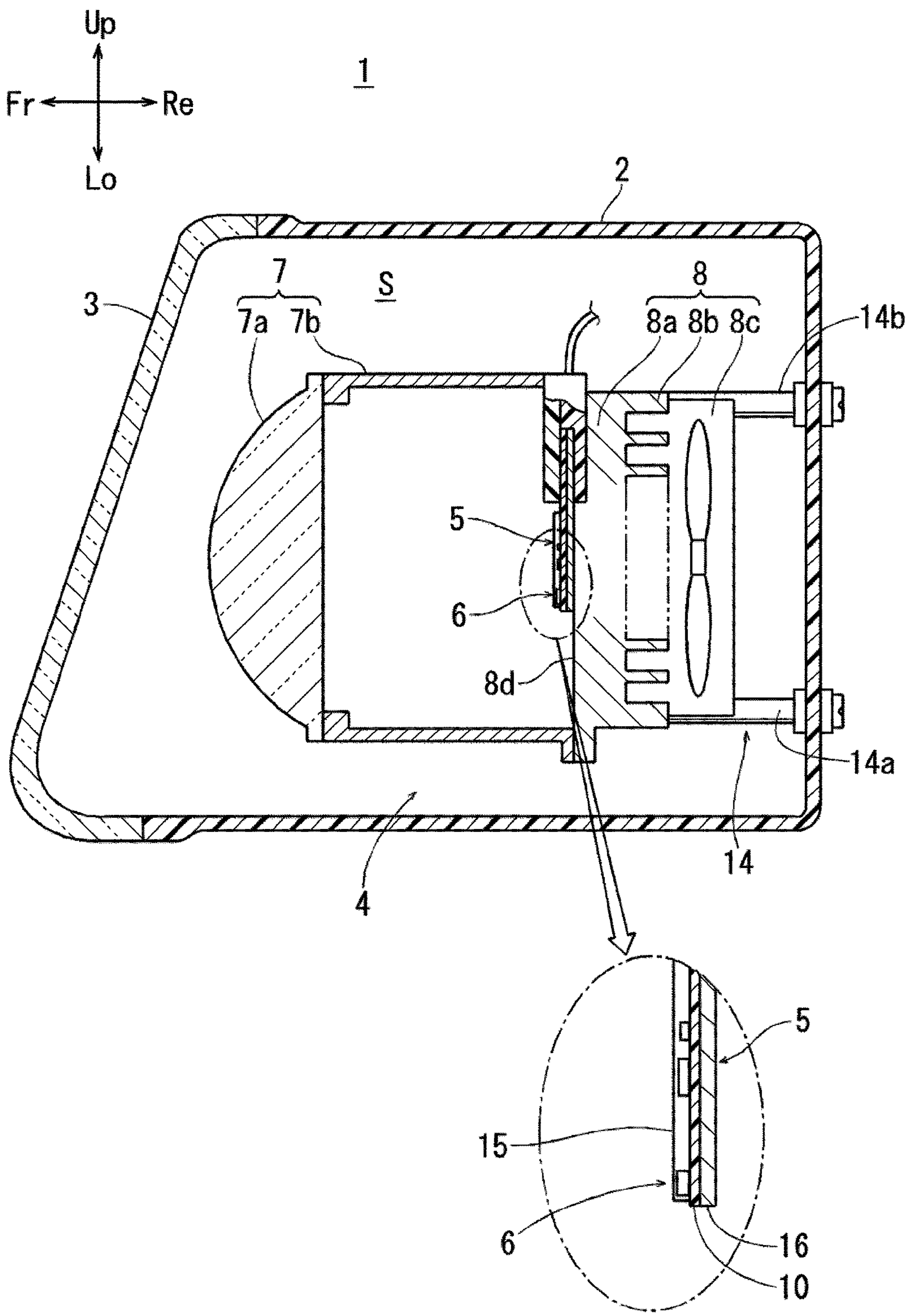
FIG. 2 is a sectional view taken along a line I-I in FIG. 1 and an enlarged sectional view of the sectional view.

A vehicle lamp 1 of a first embodiment shown in FIGS. 1 and 2 includes a lamp body 2, a front cover 3, and a lamp unit 4. The lamp body 2 has an opening on the front side of a vehicle (not shown). The front cover 3 is made of, e.g., light-transmissive resin or glass, and is attached to the opening of the lamp body 2 to form a lamp chamber S inside. The lamp unit 4 shown in FIG. 1 includes a card-type lamp unit 5 as a light emitting element light source 6 having light emitting elements 6*a* to 6*g* such as LED light sources or laser diodes, an optical unit 7, a heat dissipation unit 8, and a power supply connector 9, and is arranged inside the lamp chamber S.

Figure 3:
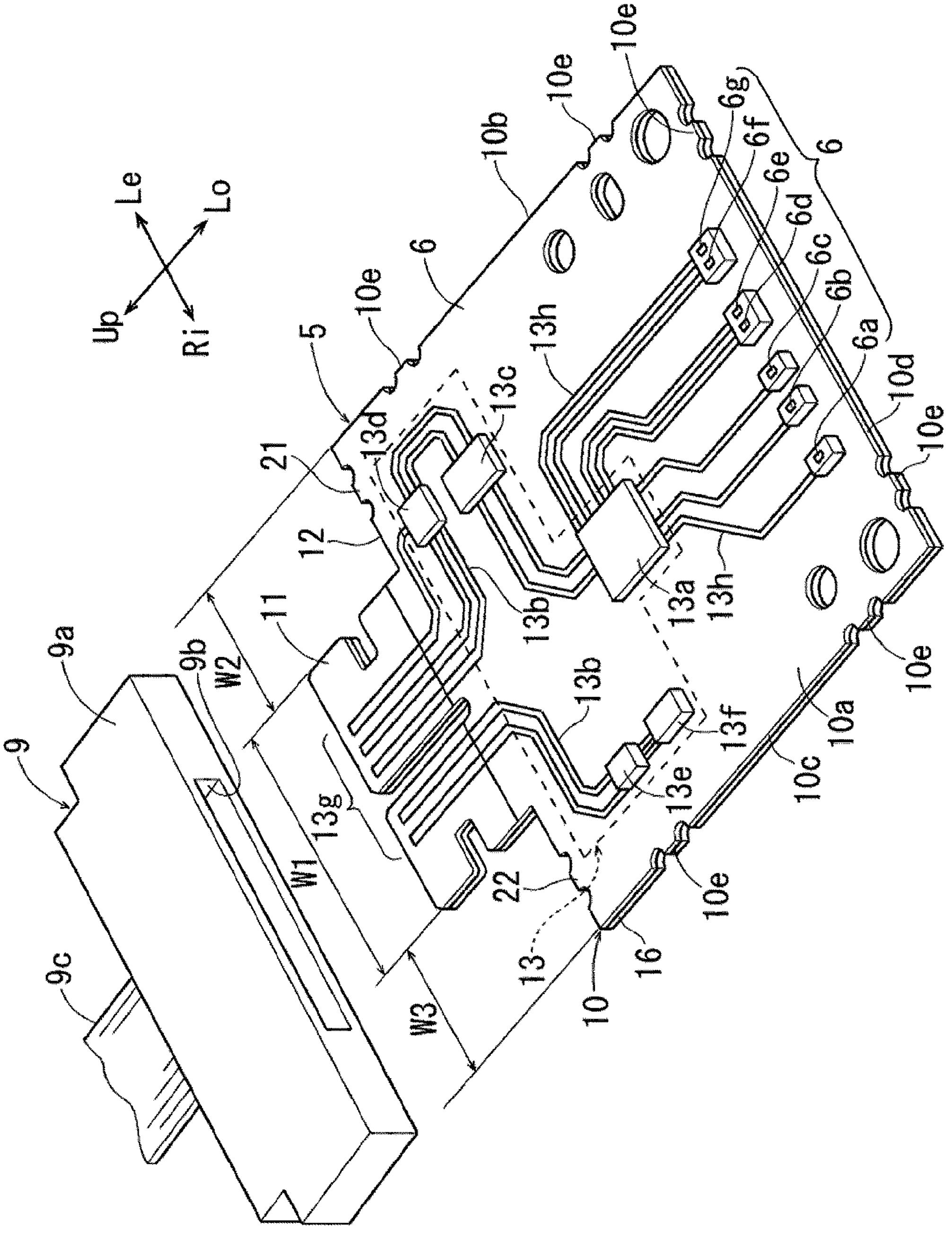
FIG. 3 is a schematic sectional view of the card-type lamp unit and a power supply connector.

The card-type lamp unit 5 shown in FIGS. 1 to 3 includes a substrate body 10 which is a glass epoxy substrate, an external connector insertion portion 11 formed as a card edge connector, and a metal plate 16 which is a heat dissipation member integrally formed with the rear surfaces of the substrate body 10 and the external connector insertion portion 11. As one example, the external connector insertion portion 11 is formed so as to protrude in an upper end direction from a connector forming side 12 which is an upper end side outer peripheral edge portion of the rectangular plate-shaped substrate body 10.

Note that the metal plate 16 integrally formed with the rear surfaces of the substrate body 10 and the external connector insertion portion 11 shown in FIG. 3 is more preferably not formed on the rear surface of the external connector insertion portion 11, but is formed integrally only with the rear surface of the substrate body 10. In this case, since the metal plate 16 is not provided on the rear surface of the external connector insertion portion 11, the metal plate 16 is not detached from the external connector insertion portion 11 formed of the glass epoxy substrate when the external connector insertion portion 11 is inserted into or removed from the power supply connector 9. When the metal plate 16 is not provided on the rear surface of the external connector insertion portion 11, a burr generated on the outer periphery of the metal plate 16 does not protrude from the outer periphery of the external connector insertion portion 11 at the time of machining the metal plate 16. Thus, it is possible to prevent damage to the power supply connector 9 due to the burr and to prevent the burr separated from the metal plate 16 from adhering to a conductive path on the substrate body 10 or the external connector insertion portion 11 and causing short-circuit.

As shown in FIG. 3, the light emitting element light source 6 including the light emitting elements 6*a* to 6*g* and a control circuit 13 for light ON/OFF are mounted on a front surface 10*a* of the substrate body 10 of the card-type lamp unit 5. The control circuit 13 includes a switch circuit 13*a* that independently switches ON/OFF of the light emitting elements 6*a* to 6*g* and a plurality of electronic components 13*c* to 13*f* including a power circuit, and the switch circuit 13*a* and the plurality of electronic components 13*c* to 13*f* are electrically connected to a terminal portion 13*g* formed on the front surface of the external connector insertion portion 11 via a metal conductive path 13*b*. The plurality of light emitting elements 6*a* to 6*g* is electrically connected to the switch circuit 13*a* via metal element conductive paths 13*h* formed by the number of light emitting elements 6*a* to 6*g*. Note that the light emitting elements 6*a* to 6*g* are not necessarily formed on the front surface of the substrate body 10, and may be directly mounted on the metal plate 16 via a through-hole formed so as to penetrate the substrate body 10 from the front to the rear. In the present embodiment, since seven light emitting elements are mounted, it is necessary to connect these elements to the switch circuit 13*a* via seven or more element conductive paths. Note that the number of light emitting elements to be mounted is not limited to seven and may be one or other plural numbers. Note that as shown in FIGS. 1 and 3, the control circuit 13 mounted on the front surface 10*a* of the substrate body 10 is invisible from the front by an extension reflector 15.

The optical unit 7 shown in FIGS. 1 and 2 includes a plano-convex transparent or translucent projection lens 7*a* and a lens holder 7*b* holding the projection lens 7*a*, and the heat dissipation unit 8 includes a metal body portion 8*a*, a plurality of metal heat dissipation fins 8*b* integrally protruding in rear of the body portion 8*a*, and a heat dissipation fan 8c attached to rear surfaces of the heat dissipation fins 8b. The heat dissipation fan 8c receives power from a not-shown power source and rotates. The projection lens 7a is fixed to the front surface of the body portion 8a of the heat dissipation unit 8 via the lens holder 7b.

As shown in FIGS. 1 and 2, the heat dissipation unit 8 is supported on the lamp body 2 via an aiming mechanism 14. The aiming mechanism 14 includes a pivot fulcrum 14a fixed to the lamp body 2 and a vertical tilting adjustment aiming screw 14b and a horizontal tilting adjustment aiming screw 14c which are each turnably supported on the lamp body 2. The body portion 8a of the heat dissipation unit 8 is supported so as to swing about the pivot fulcrum 14a and tilt vertically and horizontally based on turn of the vertical tilting adjustment aiming screw 14b and the horizontal tilting adjustment aiming screw 14c.

The power supply connector 9 shown in FIGS. 1 to 3 includes a connector body 9a, an insertion port 9b for the external connector insertion portion 11, and a power supply cable 9c receiving power from the not-shown power source.

As shown in FIGS. 1 to 3, the external connector insertion portion 11 is attached to the insertion port 9b of the power supply connector 9, and in this manner, the card-type lamp unit 5 is electrically connected to and held on the power supply connector 9 in a state of the metal plate 16 integrated on the rear surface of the substrate body 10 contacting a front surface 8d of the body portion 8a of the heat dissipation unit 8. In this state, the light emitting element light source 6 is directed forward and positioned in the vicinity of a rear focal point of the projection lens 7a. Note that in FIGS. 1 and 2, the external connector insertion portion 11 is inserted into the power supply connector 9 from above the connector insertion portion 11 arranged so as to protrude upward of the substrate body 10, but the external connector insertion portion 11 may be inserted into the power supply connector 9 from below the connector insertion portion 11 arranged so as to protrude downward of the substrate body 10.

In the card-type lamp unit 5 shown in FIGS. 1 to 3, the control circuit 13 and the light emitting element light source 6 receive power from the not-shown power source via the power supply connector 9, and the light emitting elements 6a to 6g are independently turned on and off based on control by the switch circuit 13a. The lamp unit 4 of FIG. 1 is held inside the lamp body 2 in a state of being tiltable up, down, left, and right by the aiming mechanism 14.

Figure 4:
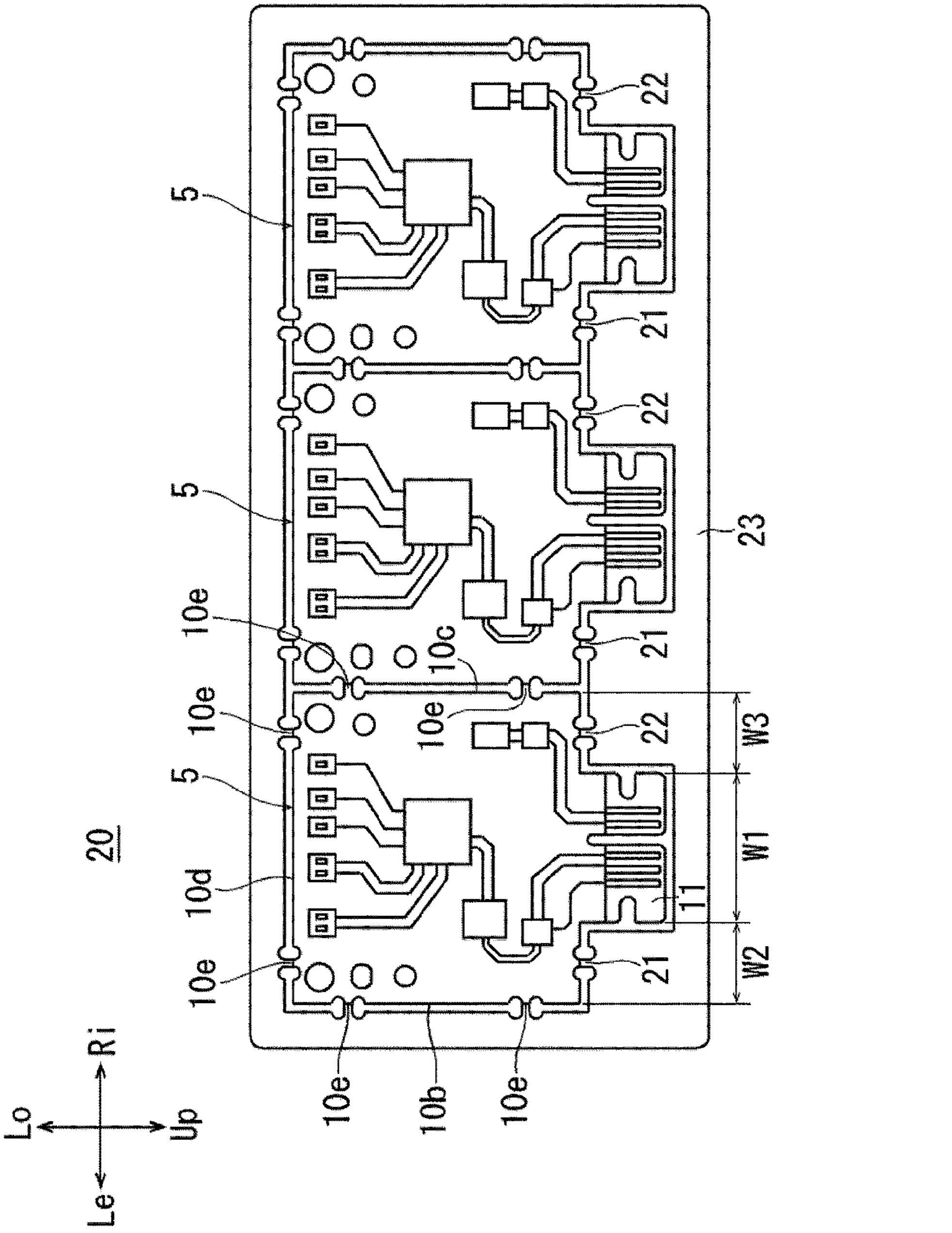
FIG. 4 is a schematic view for describing a substrate sheet in which a plurality of card-type lamp units is arranged and formed side by side.

Next, a preferred embodiment of a substrate sheet on which a plurality of card-type lamp units 5 can be formed will be described with reference to FIGS. 4 and 5. FIG. 4 shows a substrate sheet 20 on which the plurality of (three in the present embodiment, but is not limited to three) card-type lamp units 5 is integrally formed.

The card-type lamp units 5 of FIG. 4 are each integrally formed with a frame body 23 via coupling end portions (21, 22) provided on the connector forming side 12 at the left and right of the external connector insertion portion 11, and are further integrally formed with the frame body 23 or the adjacent card-type lamp unit 5 via a plurality (not limited to two locations in the present embodiment, and may be one location) of coupling end portions 10e each formed on the left end side 10b, right end side 10c, and lower end side 10d of the substrate body 10.

On the substrate sheet 20 of the present embodiment shown in FIG. 4, an internal stress causing "warpage" due to a difference in a linear expansion coefficient between the substrate body 10 formed of the glass epoxy substrate and the metal plate 16 is generated by heat treatment. However, according to the substrate sheet 20 of FIG. 4, in addition to the plurality of coupling end portions 10e integrating the three sides, which are the left end side 10b, the right end side 10c, and the lower end side 10d, of the substrate body 10 with the frame body 23, the coupling end portions 21, 22 for the frame body 23 are provided closest to the external connector insertion portion 11 at the left and right of the connector forming side 12 of the substrate body 10, and all the four sides of the substrate body 10 are integrated with the frame body 23. Thus, in the card-type lamp unit 5, warpage in the vicinity of the external connector insertion portion 11, which is generated due to the internal stress in the heat treatment, relative to the frame body 23 is reduced particularly by the coupling end portions 21, 22.

In addition, according to the card-type lamp unit 5 shown in FIG. 3, since the control circuit 13 for light ON/OFF, which includes the switch circuit 13a for light ON/OFF, is not installed outside, but is mounted on the substrate body 10, it is not necessary to form the terminal portion 13g corresponding to the element conductive path 13h connected to each of the plurality of light emitting elements on the external connector insertion portion 11 and the number of terminal portions 13g can be reduced. Thus, according to the substrate sheet 20 for the card-type lamp unit 5 as shown in FIG. 4, a width W1 of the external connector insertion portion 11 can be narrowed, and therefore, a greater width W2, W3 of the connector forming side 12 at the left and right of the external connector insertion portion 11 can be ensured. Thus, the width of the coupling end portion 21, 22 on the connector forming side 12 can be increased, or two or more coupling end portions 21, 22 can be provided at the left and right, so that prevention of the warpage relative to the frame body 23, which is generated in the vicinity of the external connector insertion portion 11, can be enhanced.

Each card-type lamp unit 5 of FIG. 4 is formed in such a manner that all the coupling end portions 21, 22 and the plurality of coupling end portions 10e are separated from the frame body 23.

Next, a substrate sheet 25, which is a modification of the substrate sheet 20 of FIG. 4 and is formed such that the external connector insertion portions 11 of the plurality of card-type lamp units 5 are arranged so as to face each other, will be described with reference to FIG. 5.

Figure 5:
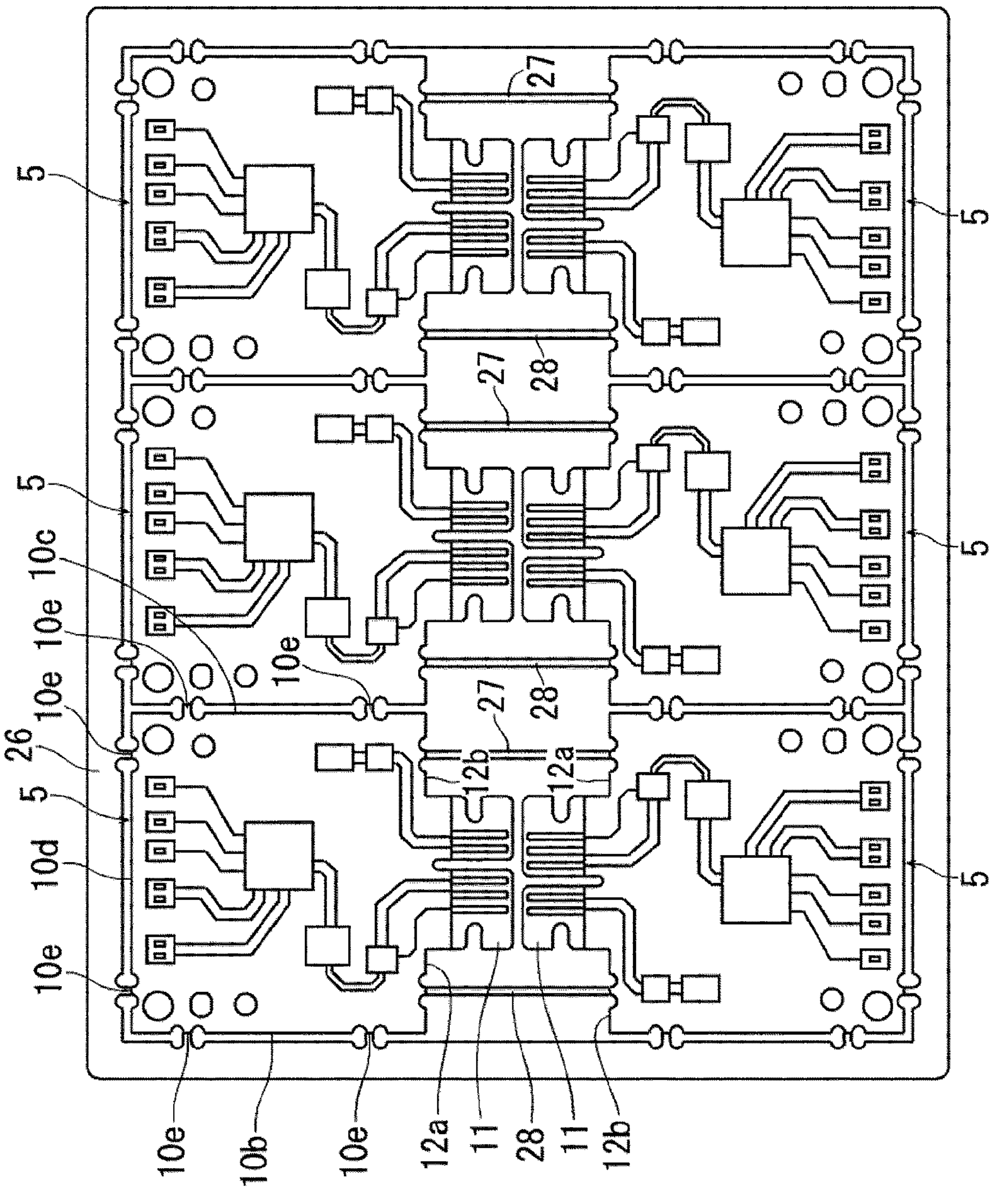
FIG. 5 is a schematic view for describing a substrate sheet formed such that external connector insertion portions of a plurality of card-type lamp units are arranged so as to face each other.

The substrate sheet 25 of FIG. 5 is formed such that the plurality (six in the present embodiment, but not limited to six) of card-type lamp units 5 whose external connector insertion portions 11 are arranged so as to face each other is integrally formed. The card-type lamp unit 5 of FIG. 5 is not structurally different from that of the substrate sheet 20 of FIG. 4 in that the card-type lamp unit 5 is integrally formed with a frame body 26 or the adjacent card-type lamp unit 5 via the plurality (not limited to two locations in the present embodiment, and may be one location) of the coupling end portions 10e each formed on the left end side 10b, the right end side 10c, and the lower end side 10d of the substrate body 10. On the other hand, for a pair of card-type lamp units 5 whose external connector insertion portions 11 are arranged so as to face each other in the substrate sheet 25 of FIG. 5, an inter-coupling end portion 27 is provided between a connector forming side 12a on the left side of one card-type lamp unit 5 and a connector forming side 12b of the card-type lamp unit 5 opposed thereto, and an inter-coupling end portion 28 is provided between a connector forming side 12b on the right side of the one card-type lamp unit 5 and a connector forming side 12a of the card-type lamp unit 5 opposed thereto. Of the pair of card-type lamp units 5 whose external connector insertion portions 11 face each other, the connector forming sides 12*a*, 12*b* are integrally formed via the inter-coupling end portions 27, 28 in addition to the plurality of coupling end portions 10*e* integrating the three sides, which are the left end side 10*b*, the right end side 10*c*, and the lower end side 10*d*, of the substrate body 10 with the frame body 26.

According to the substrate sheet 25 of FIG. 5, in addition to the plurality of coupling end portions 10*e* integrating the three sides, which are the left end side 10*b*, the right end side 10*c*, and the lower end side 10*d*, of the substrate body 10 with the frame body 26, particularly the inter-coupling end portions 27, 28 integrating the left and right connector forming sides 12*a*, 12*b* of the card-type lamp units 5 whose external connector insertion portions 11 are arranged so as to face each other restrict warpage generated in each of the opposing external connector insertion portions 11 even when the heat treatment is performed, so that prevention of the warpage generated in the vicinity of each external connector insertion portion 11 can be further enhanced.

Each card-type lamp unit 5 of FIG. 5 is formed in such a manner that all the inter-coupling end portions 27, 28 and the plurality of coupling end portions 10*e* are separated from the frame body 26.

Figure 6:
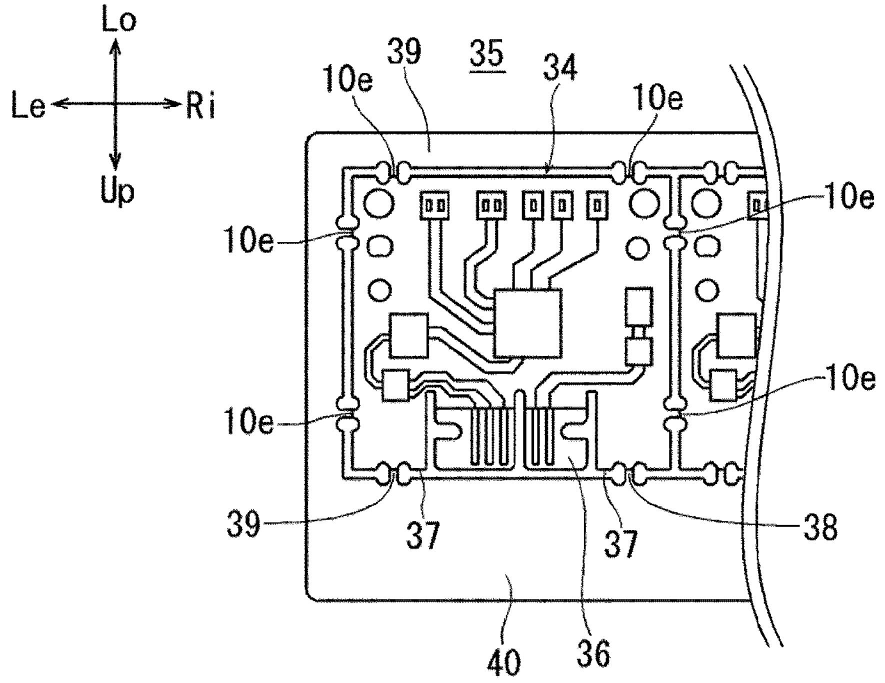
FIG. 6 is a schematic view for describing a substrate sheet in which card-type lamp units of a modification are arranged and formed side by side.
Figure 7:
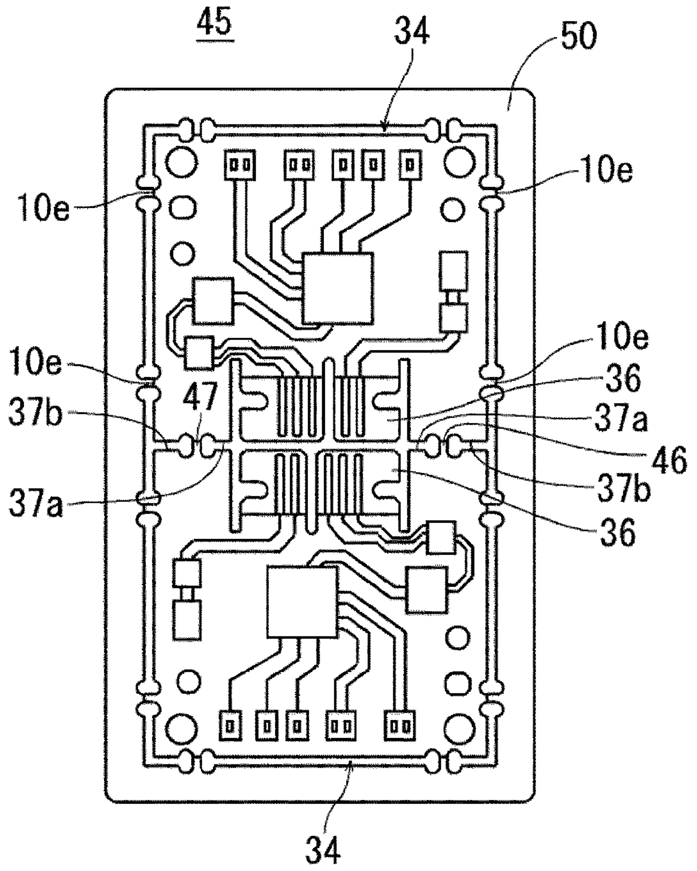
FIG. 7 is a schematic view for describing a substrate sheet formed such that external connector insertion portions of a plurality of card-type lamp units of a modification are arranged so as to face each other.

Note that FIG. 6 shows a substrate sheet 35 in which card-type lamp units 34, which are a modification of the card-type lamp unit 5, are formed in parallel side by side, and FIG. 7 shows a substrate sheet 45 in which external connector insertion portions 36 of the card-type lamp units 34 are arranged so as to face each other.

Instead of the external connector insertion portion 11 protruding upward of the connector forming side 12 in the card-type lamp unit 5 of FIG. 3, the card-type lamp unit 34 of FIG. 6 is configured such that the upper end of an external connector insertion portion 36 is flush with a connector forming side 37. Note that the card-type lamp unit 34 has a configuration common to that of the card-type lamp unit 5 of FIG. 5 except for the form of the external connector insertion portion 36 and arrangement of the control circuit 13 electrically connected to the light emitting element light source 6.

The substrate sheet 35 shown in FIG. 6 is configured such that the card-type lamp units 34 of FIG. 6 are arranged and formed side by side on a frame body 40. According to the substrate sheet 35, coupling end portions 38, 39 for the frame body 40 are provided closest to the external connector insertion portion 36 at the left and right of the connector forming side 12 of the substrate body 10, and the card-type lamp units 34 are integrated with the frame body 40 via the coupling end portions 38, 39. Thus, warpage generated relative to the frame body 40 due to the internal stress when the heat treatment is performed is prevented. Each card-type lamp unit 34 of FIG. 6 is formed in such a manner that all the coupling end portions 38, 39 and the plurality of coupling end portions 10*e* are separated from the frame body 40.

The substrate sheet 45 of FIG. 7 is integrated with a frame body 50 in a state of the external connector insertion portions 36 of the card-type lamp units 34 of FIG. 6 being arranged so as to face each other.

For a pair of card-type lamp units 34 whose external connector insertion portions 36 are arranged so as to face each other in the substrate sheet 45 of FIG. 7, an inter-coupling end portion 46 is provided between a connector forming side 37*a* on the left side of one card-type lamp unit 34 and a connector forming side 37*b* on the right side of the card-type lamp unit 34 opposed thereto, and an inter-coupling end portion 47 is provided between a connector forming side 37*b* on the right side of the one card-type lamp unit 34 and a connector forming side 37*a* on the left side of the card-type lamp unit 34 opposed thereto. The pair of card-type lamp units 34 whose external connector insertion portions 36 face each other is configured such that the left and right connector forming sides 37*a*, 37*b* are integrally formed via the inter-coupling end portions 46, 47. According to the substrate sheet 45, the inter-coupling end portions 46, 47 integrating the left and right connector forming sides 37*a*, 37*b* of the card-type lamp units 34 whose external connector insertion portions 36 are arranged so as to face each other restrict warpage generated relative to the frame body 50 even when the heat treatment is performed, so that prevention of the warpage generated in the vicinity of each external connector insertion portion 36 can be further enhanced.

Each card-type lamp unit 34 of FIG. 7 is formed in such a manner that all the inter-coupling end portions 46, 47 and the plurality of coupling end portions 10*e* are separated from the frame body 50.

The present international application claims priority based on Japanese Patent Application No. 2022-005414 filed on Jan. 18, 2022, and the entire contents of Japanese Patent Application No. 2022-005414 are incorporated herein by reference.

The description of the specific embodiments of the present invention is presented for the purpose of illustration. The specific embodiments are not intended to be exhaustive or to limit the invention as it is in the form described. It is obvious to those skilled in the art that many modifications and alterations are possible in light of the contents of the description above.

LIST OF REFERENCE SIGNS

- 5 Card-type lamp unit
- 6 Light emitting element light source
- 6*a* to 6*g* Light emitting element
- 10 Substrate body
- 10*b* to 10*d* Outer peripheral side of substrate body
- 11 External connector insertion portion
- 12 Connector forming side
- 12*a* Left connector forming side
- 12*b* Right connector forming side
- 13 Control circuit for light ON/OFF of light emitting element
- 16 Metal plate as heat dissipation member
- 20 Substrate sheet
- 21, 22 Coupling end portion
- 23 Frame body
- 25 Substrate sheet
- 26 Frame body
- 27, 28 Inter-coupling end portion

The invention claimed is:

1. A substrate sheet for a card-type lamp unit, comprising:
   a card-type lamp unit including a polygonal substrate body having an outer peripheral side and a connector forming side, an external connector insertion portion formed on the connector forming side, a heat dissipation member integrated with the substrate body and having a linear expansion coefficient different from that of the substrate body, and a light emitting element light source connected to a control circuit for light ON/OFF; and
   a frame body integrated with the card-type lamp unit via a coupling end portion formed on the outer peripheral side of the polygonal substrate body,
   wherein a coupling end portion for the frame body is provided on the connector forming side.

2. The substrate sheet for the card-type lamp unit according to claim 1, wherein a plurality of light emitting elements forming the light emitting element light source is provided on the substrate body, and the control circuit for light ON/OFF is mounted on the substrate body.

3. The substrate sheet for the card-type lamp unit according to claim 1, wherein the card-type lamp unit includes a plurality of card-type lamp units, and each card-type lamp unit includes an inter-coupling end portion coupling connector forming sides to each other instead of the coupling end portion for the frame body.

4. A card-type lamp unit formed by being separated from the frame body by cutting of the coupling end portion of the substrate sheet for the card-type lamp unit according to claim 1.

5. A vehicle lamp comprising: the card-type lamp unit according to claim 4.

* * * * *